United States Patent [19]

Rieck et al.

[11] Patent Number: 4,916,105

[45] Date of Patent: Apr. 10, 1990

[54] CATALYST AND METAL FERRITES FOR REDUCTION OF HYDROGEN SULFIDE EMISSIONS FROM AUTOMOBILE EXHAUST

[75] Inventors: Jeffrey S. Rieck, Jessup; Wilson Suarez, Columbia; Joseph E. Kubsh, Silver Spring, all of Md.

[73] Assignee: W. R. Grace & Co.-Conn., New York, N.Y.

[21] Appl. No.: 307,649

[22] Filed: Feb. 7, 1989

[51] Int. Cl.$^4$ .................. B01J 21/04; B01J 23/10; B01J 23/40

[52] U.S. Cl. .................... 502/303; 502/302; 502/324; 502/326; 502/327; 502/524

[58] Field of Search .............. 502/326, 327, 524, 302, 502/303, 324

[56] References Cited

U.S. PATENT DOCUMENTS

| | | | |
|---|---|---|---|
| 3,957,691 | 5/1976 | Adachi et al. | 502/524 X |
| 4,440,874 | 4/1984 | Thompson | 502/327 |
| 4,591,580 | 5/1986 | Kim et al. | 502/303 |
| 4,738,947 | 4/1988 | Wan et al. | 502/304 |
| 4,760,044 | 7/1988 | Joy, III et al. | 502/303 |
| 4,780,447 | 10/1988 | Kim et al. | 502/243 |

FOREIGN PATENT DOCUMENTS

| | | |
|---|---|---|
| 0244127 | 4/1987 | European Pat. Off. . |
| 988327 | 1/1983 | U.S.S.R. .............. 502/326 |

OTHER PUBLICATIONS

Tamhankar et al. in Ind. Eng. Chem. Process Des. Dev., 25,429, (1986).

*Primary Examiner*—W. J. Shine
*Attorney, Agent, or Firm*—Edward J. Cabic

[57] ABSTRACT

A catalyst, which is capable of controlling not only HC, CO and $NO_x$, but also $H_2S$ emission from the tail pipe of catalytic converter automobiles, is made of platinum-group metals promoted by rare earth oxides and containing a metal ferrite. The ferrite is present in an $H_2S$ gettering amount and in an amount up to about 20 weight % of the catalyst. The catalyst comprises an alumina support and is applied as a washcoat to a substrate, such as a honeycomb monolith made from ceramic or metal.

21 Claims, 1 Drawing Sheet

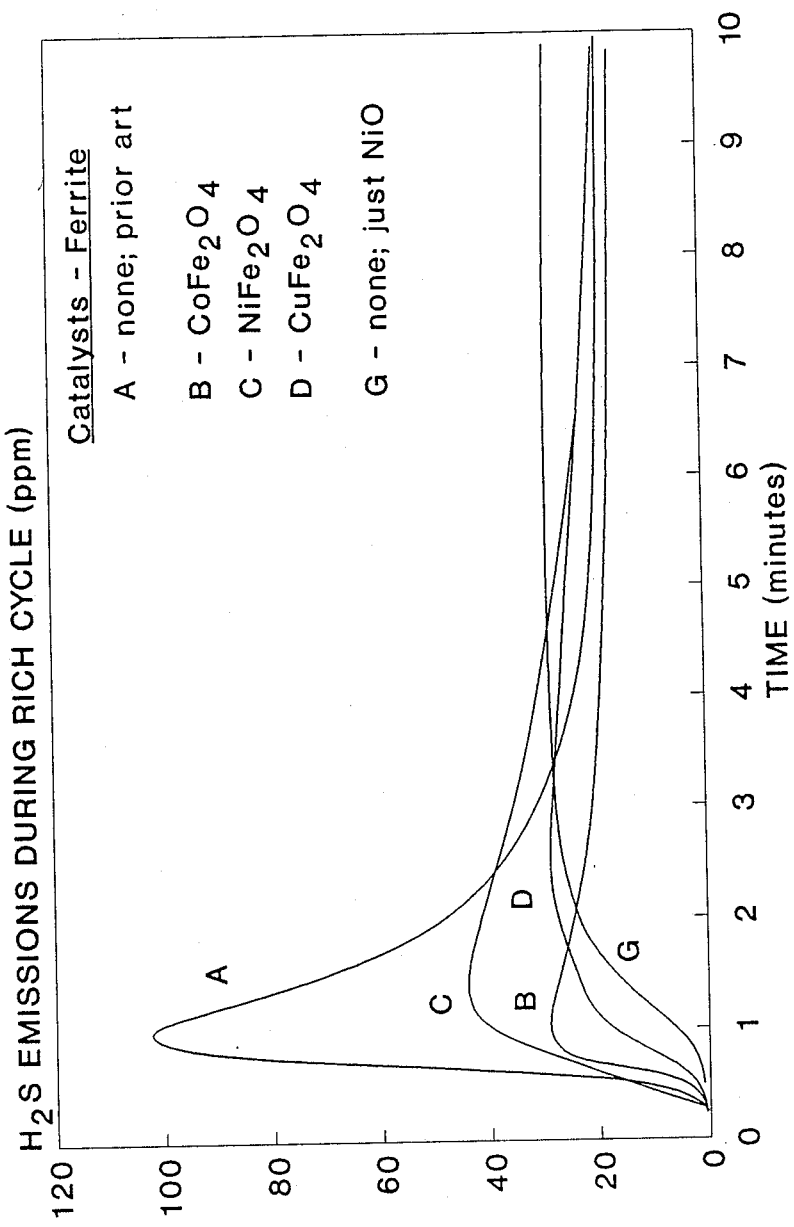

CATALYST AND METAL FERRITES FOR REDUCTION OF HYDROGEN SULFIDE EMISSIONS FROM AUTOMOBILE EXHAUST

BACKGROUND OF THE INVENTION

1. Field of the Invention

This invention relates to catalyst compositions and methods of producing auto exhaust catalysts that substantially reduce $H_2S$ odor from the tail pipe, while still meeting catalytic performance requirements for three-way conversions.

2. Description of the Previously Published Art

With the advent of advanced catalysts for controlling auto exhaust emissions, typically containing a higher than usual level of rare earth oxides, especially ceria, the level of $H_2S$ emission from tail pipes has significantly increased, to the extent that the strong $H_2S$ odor can no longer be tolerated.

In practice, however, it is rather difficult to develop an auto exhaust catalyst that meets the requirements for both the long-term catalytic performance for three-way conversions as well as $H_2S$ because of the following fact. The performance of the catalyst which has already been optimized for three-way conversions tends to be adversely affected by any chemical modification introduced to the existing catalyst to meet the requirement for $H_2S$.

U.S. Pat. No. 4,780,447 teaches that NiO and/or $Fe_2O_3$ is useful in the control of $H_2S$ in certain types of automobile catalytic converters. The catalyst in that patent is specific to pelleted-type auto catalysts. The invention to be described here is applicable to the more widely used washcoats supported on ceramic or metal monoliths and has limited applicability to pelleted-type catalysts. Also the NiO and $Fe_2O_3$ components described in U.S. Pat. No. 4,780,447 are added by an impregnation process. As will be described the additives of this invention are added as a bulk oxide to the catalyst composition.

European patent application No. 244,127 published Nov. 11, 1987, describes a three-way catalyst (TWC) comprising a Pt-group metal and sufficient Ni or NiO to reduce $H_2S$ when the catalyst is used under fuel-rich conditions.

U.S. Pat. No. 4,738,947, discloses a TWC comprising alumina, a Pt-group metal, and a rare earth metal oxide plus a "p-type" metal oxide (meaning oxide of Co, Ni, Fe, Mn, Cr, etc.). In this patent the "p-type" metal oxide is deposited by an impregnation process on cerium oxide powder present in the catalyst. This combination is claimed to have improved catalytic performance, but no indication of reduced $H_2S$ emissions is given.

U.S. Pat. No. 4,591,580 discloses a stabilized and doubly promoted platinum group catalyst that could be used in conjunction with an oxide additive. The alpha-alumina formation was greatly reduced by stabilizing a transitional alumina support with lanthana or La-rich rare earth oxides while still maintaining high catalytic performance. This catalyst comprises four material components which are (1) support or carrier, (2) stabilizer, (3) promoters which are preferably $CeO_2$ and alkali metal oxides and (4) catalytic metals. The description of this catalyst did not have any discussion of the $H_2S$ problem in auto emission control. There was disclosed an optional embodiment in which Ni could be added as 0.5 to 20 wt. % NiO.

U.S. Pat. No. 4,760,044 teaches a method for reduced $H_2S$ emissions based on the use of compounds which form stable sulfides under fuel rich conditions. Compounds that form such stable sulfides include Ni, Co, Zn, and Cu. Such elements are supported on oxides such as ceria, titania, or zirconia in this patent and introduced on the said support by an impregnation process.

As indicated by the prior art, Ni or NiO is a superior $H_2S$ gettering agent. However, in this use nickel may be gradually lost to the atmosphere, and the amount of loss, though small, may cause problems vis-a-vis anti-pollution regulations in some areas or cause potential health concerns. (OSHA has stated nickel to be carcinogenic). The instant invention aims at avoiding nickel problems without sacrifice of catalyst performance. We accomplish this by the use of a metal ferrite as an $H_2S$ gettering agent. Ferrites are binary oxide compounds composed of iron oxide and the oxide of one other transition metal (e.g. Cu, Co, Mg, Ni). The use of nickel ferrite ($NiFe_2O_4$) as herein disclosed shows performance similar to that of NiO but at a substantially reduced level of Ni, since Ni is only about one-third of the total weight of $NiFe_2O_4$. Other non-Ni containing ferrites such as $CoFe_2O_4$ and $CuFe_2O_4$ as herein disclosed show performance similar to that of NiO. The effectiveness of the ferrites is rather surprising, since the aluminate analogs ($CoAl_2O_4$, $NiAl_2O_4$) are substantially without effect in $H_2S$ gettering. Also the ferrite additives have less impact on catalytic performance than the simple transition metal oxides such as CoO or CuO.

The use of ferrites such as $ZnFe_2O_4$ and $CuFe_2O_4$ in scavenging $H_2S$ from gas steams derived from coal combustion in the power generation industry is known. See, for example, Tamhankar et al. in Ind. Eng. Chem. Process Des. Dev., 25, 429 (1986). Such ferrite function differs from ours in important respects. For example, in this power generation application the ferrite-$H_2S$ adduct must be regenerated in a separate operation using an oxygen-containing stream, a process convenience which is impossible in an auto catalyst, where the ferrite must be regenerated in situ by the very effluent that "poisons" it.

3. Objects of the Invention

It is an object of this invention to chemically modify the auto exhaust emission control catalyst formulation to virtually eliminate the $H_2S$ odor while still maintaining adequate catalyst performance for controlling hydrocarbon (HC), carbon monoxide (CO), and nitrogen oxides ($NO_x$).

It is a further object of this invention to disclose a method whereby a slight and yet effective chemical modification can make a TWC highly efficient in lowering $H_2S$ emission from the tail pipe while retaining virtually all or adequate catalyst efficiency for three-way conversions.

It is a further object of this invention to add an $H_2S$ gettering ingredient to an auto exhaust emission control catalyst while maintaining the activity for the control of the other emissions.

It is a further object of this invention to add an $H_2S$ gettering ingredient to an auto exhaust emission control catalyst in a manner so as to achieve a maximum effect on $H_2S$ control using a minimum level of $H_2S$ gettering ingredients.

A still further object is to add an $H_2S$ gettering ingredient to an auto exhaust emission control catalyst, which ingredient is either nickel-free or contains only a minimal amount of nickel.

Another objective is to provide an efficient TWC meeting regulatory Ni maxima.

These and further objects will become apparent as the description of the invention proceeds.

SUMMARY OF THE INVENTION $H_2S$ emission can be effectively lowered by including a metal ferrite as an $H_2S$ gettering ingredient in the catalyst formulation, especially when the formulation is based on alumina. This invention relates to the ferrite-containing catalyst system, the use of ferrite additives in mobile source pollution control, and a method of making the composite catalyst system to ensure high catalytic performance and durability with low levels of $H_2S$ emissions.

The catalyst of this invention comprises an alumina support, noble metals promoted with ceria-rich rare earth oxides, and a metal ferrite as an $H_2S$ gettering ingredient. The ferrite is present in an $H_2S$ gettering amount, and in an amount up to about 20 wt. % based on total weight of catalyst, including alumina support, but excluding weight of substrate, e.g., monolith, etc. The substrate can be a ceramic or metal monolith, a metal foil or a metal plate.

More specifically, the metal ferrite is suitably about 1-20 weight % of the catalyst support (suitably platinum-metal(s)-catalyzed alumina); i.e., about 1-20% ferrite, preferably about 3-15%, and 80-99% catalyzed alumina. The weight ratio of metal ferrite:platinum metal(s) is suitably about 1-100:1, preferably about 10:1.

The ferrite-containing washcoat slurry per se is an important aspect of the invention. To make this slurry, the ferrite is suitably added to a slurry of the catalyzed alumina to provide about 0.2-7 wt. %, preferably about 4%, ferrite with about 20-50% catalyzed alumina, preferably about 40%, balance water to make 100%. The alumina suitably comprises about 0.1-7.5 wt. % Pt, Pd, and/or Rh, but generally not exceeding about 2.5% for any one of these components. Preferably the alumina comprises about 1.5% Pt, about 0.5 Pd, about 0.3 Rh, about 4% lanthana, and about 25% ceria.

Percentages are by weight, unless otherwise stated. Also, when percentage of a component in a composition is stated, the percentage is based on the total composition including the component. Weight of monoliths or like substrates is excluded.

The invention includes passing auto exhaust through a three-way catalyst containing a metal ferrite as $H_2S$ getter, preferably using the herein described compositions. In this use the catalyst is carried as a coating on a substrate (suitably a "honeycomb"), which may be ceramic or metal. Excellent results have been obtained on both ceramic and metal monoliths.

In this invention the ferrite $H_2S$ getter is added as a bulk oxide to the catalyst. Because the ferrite is added in this fashion interactions between the getter and the catalyst are minimized. Also this method of introduction of the getter allows one to use this getter approach with a wide variety of exhaust control catalyst compositions. The catalyst portion of the composite system can utilize any of the systems known to the art for successful three-way or oxidation-only activity. For example the catalyst portion can include the use of thermally stabilized or unstabilized high surface area aluminas. Thermally stabilized aluminas incorporate elements such as Si, Ba, Zr, La, and/or Mg into the alumina structure (as taught by existing art) to control the sintering characteristics of the alumina. Other catalyst supports such as zirconia, titania, alpha alumina, silica, and combinations of these with thermally stabilized or unstabilized high surface area aluminas may also be used in the catalyst portion of the composite system. The ceria promoter required in most three-way catalyst applications may also be included in this invention. The ceria can be added by an impregnation process from a suitable cerium salt, or the ceria promoter may be added as a bulk oxide in a manner similar to the ferrite $H_2S$ getter. Combinations of bulk and impregnated ceria are also possible in conjunction with the ferrite additive. Any combination of Group VIII metals such as Pt, Pd, Rh, Ir, and/or Ru can be incorporated into the catalyst portion of the composite and be used in concert with the ferrite getter to reduce $H_2S$ emissions from the composite catalyst system.

BRIEF DESCRIPTION OF THE DRAWING

The FIGURE is a graph of $H_2S$ emissions performance over time for several catalysts detailed herein.

DESCRIPTION OF THE PREFERRED EMBODIMENTS

The level of $H_2S$ emissions can be drastically lowered when a ferrite $H_2S$ gettering ingredient is present in sufficient concentration in the catalyst. Sufficient $H_2S$ getter concentration with little sacrifice in TWC performance is obtained by controlling the overall preparation process.

The final, ready-for-use catalyst of this invention can be considered a two-component system. One component of the system is the primary catalytic function of the system; the second component is the ferrite getter. The primary catalytic component comprises a primary refractory inorganic oxide selected from the group consisting of alumina, silica, aluminosilicates, zirconia, titania, or mixtures thereof, with alumina being preferred. The preferred support or carrier is a transitional alumina having a BET ($N_2$) surface area in the range from at least 20 to 250 $m^2/g$, preferably from about 70 to 200 $m^2/g$.

The preferred alumina refractory support may be stabilized against loss of surface area at high temperatures by any methods known to the art. This stabilization in general involves introduction of elements such as Ba, Si, Mg, or La into the alumina structure by an impregnation process followed by high-temperature activation. In one embodiment a transitional alumina is stabilized by $La_2O_3$. The preferred level of the $La_2O_3$ stabilizer in this instance is 2 to 6 wt. % $La_2O_3$. The $La_2O_3$ stabilizer or other stabilizer additives may be added during the precipitation of the alumina support as well. For example, lanthanum nitrate can be used as the lanthanum source in the alumina production processes known to the art. When the alumina salt precursors are precipitated in the presence of the lanthanum nitrate by the addition of a base, the precipitated product is a solid solution of $La_2O_3$ and $Al_2O_3$. Again the preferred level of $La_2O_3$ in this co-precipitated solid is 2-6 wt. % $La_2O_3$.

The primary catalytic component also preferably contains the promoter ceria. Ceria is present as a promoter from at least 1 to 50 wt. % $CeO_2$, preferably from 2 to 30 wt. % $CeO_2$. This $CeO_2$ promoter in one embodiment is added to the stabilized alumina support in a separate impregnation step from the lanthana stabilization step. In other words, when doing the initial lanthana stabilization step one cannot use a naturally occurring mixed rare earth oxide and expect that the $CeO_2$ contained in the mixed rare earth oxide will provide the desired level of $CeO_2$ promotion. Instead, it is preferred to add the $CeO_2$ in a later impregnation step.

A similar strategy is used if stabilizers other than $La_2O_3$ are used or if an alumina support without stabilizers is used as the primary refractory support. In a second embodiment the ceria promoter is added as bulk rare earth-containing powder and mixed with the primary refractory support to form a homogeneous mixture. The only required criteria of the promoter here is that the rare earth (cerium) component is insoluble in water since this is required in order to prepare a slurry of the final mixture. Thus, insoluble solids such as cerium sulfate, cerium oxalate, or cerium oxide can be used, with cerium oxide being preferred. In a third variation the ceria promoter component can be made up of a combination of ceria impregnated on the primary refractory support, with ceria also present as a bulk oxide.

The primary catalytic component of this invention is completed by the addition of a platinum group metal to the ceria/alumina composite. Tis metal may be platinum, palladium, rhodium, ruthenium, iridium, osmium, and mixtures thereof, with the preferred metals being Pt, Pd, or Rh, either alone or in any combination. When the platinum group metal contains more than one of such components, the component may be composed of a major amount of platinum or palladium and a minor amount of one or more of the other platinum group metals such as rhodium. When platinum and palladium are used alone, they can be in any ratio. The catalytic metals mixture may comprise from about 0.1 to about 7.5 wt. % of the catalyst. The metal mixture itself is preferably about 10–20 wt. % rhodium and about 80–90 wt. % platinum, palladium, or mixtures thereof.

Various compounds, complexes, or fine metal dispersions of any of the platinum group metals in an aqueous or an organic medium may be used to achieve deposition of the platinum group metal component on the ceria/alumina composite. A suitable liquid medium will not react with the platinum group metal component and is removable on drying which can be accomplished as part of the preparation or in use of the catalyst. Water soluble platinum group metal compounds or complexes may conveniently be used.

When platinum and rhodium are the desired main catalytic metals, chloroplatinic acid and rhodium chloride are examples of soluble compounds which can be used for impregnating the support. The chloroplatinic acid and rhodium trichloride can be in a common aqueous solution or in separate aqueous solutions. Where both a platinum and a rhodium component are desired and separate aqueous solutions are used, the impregnation of the alumina or alumina plus cerium oxide support with the solutions can be performed sequentially in any order. Other water soluble compounds or complexes may be employed to prepare the impregnation solutions. These include ammonium chloroplatinate, hydroxy disulfite platinum (II) acid, bromoplatinic acid, platinum dichloride, platinum tetrachloride hydrate, platinum dichlorocarbonyl dichloride, dinitrodiamino platinum, sodium tetranitroplatinate, hexamminerhodium chloride, rhodium carbonylchloride, rhodium trichloride hydrate, rhodium nitrate, sodium hexachlororhodate, and sodium hexanitrorhodate.

Utilization of a platinum or rhodium chloride compound such as chloroplatinic acid or rhodium trichloride is ordinarily preferred. Hydrogen chloride, nitric acid or other suitable materials may be added to the solution in order to further facilitate the uniform distribution of the noble metal components throughout the alumina support material.

If it is desired to disperse palladium onto an inorganic oxide support, the palladium may be added to the inorganic oxide support by commingling the latter with an aqueous solution of chloropalladic acid, drying and calcining in air. Other water soluble compounds or complexes of palladium may be employed such as palladium chloride, palladium nitrate, diamminepalladium hydroxide, and tetramminepalladium chloride.

Further, when an iridium component is incorporated into the catalyst, the iridium component may be added to the inorganic oxide support by commingling the later with an aqueous or anhydrous alcoholic solution of iridium salts. Examples of such salt are hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride.

In the catalyst of this invention, the platinum group metals provide the catalytically active surfaces for oxidation, reduction and decomposition reactions and are present in amounts sufficient to provide catalytic compositions having significant activity for catalyzing these reactions. As already described, the amount of platinum group metal(s) used is a minor portion of the catalyst composite.

The preferred $H_2S$-gettering ferrites are $MFe_2O_4$ where M is Cu, Co, Zn, Ni, Fe, Mg, or Mn. The amount employed must be sufficient to provide $H_2S$ gettering, but not so much that it interferes with the activity of the catalytic component. In general, the total amount of metal ferrite should be within the range of about 1 to 20 wt. %, and preferably about 3–15 wt. % based on the weight of total catalyst or washcoat only (not including weight of substrate, e.g., monolith).

The ferrites can be prepared by various ways known in the art, e.g., by precipitation from aqueous solutions of metal salts; by evaporation of solutions of mixed nitrates; by mixing and firing of the component oxides, etc. We prefer the precipitation route which is illustrated in Example 1. In this method a solution of ferric nitrate and a second metal nitrate (e.g., nitrate of Cu, Co, Zn, Ni, Mg, Mn, etc.) is treated with a base (e.g., NaOH, or tetraalkylammonium hydroxide), and the resulting precipitate is recovered, dried, crushed, and calcined in air, e.g., at 1000° C.

Ferrites prepared by the precipitation route appear to have a higher phase purity (i.e., they are more crystalline) than those prepared by the evaporation of mixed nitrate solutions. The $H_2S$ gettering behavior of the ferrite additive is dependent on the phase purity of the preparation used. It is greatly preferred to prepare an additive that is essentially 100% ferrite in phase purity. The presence of incomplete reaction products such as the oxides of Fe or oxides of the second metal addition result in poorer $H_2S$ gettering properties and in catalyst performance penalties.

Although the ferrites of Cu, Co, Zn, Ni, Mg, Mn and Fe all show some ability to reduce $H_2S$ emissions when used as additives in these catalysts, the preferred additives are $CoFe_2O_4$, $CuFe_2O_4$, and $NiFe_2O_4$. These additives when incorporated according to the teachings of this invention reduce $H_2S$ emissions to levels comparable with those achieved with NiO additions as taught in the art and do not significantly alter catalytic performance or durability.

The addition of the ferrite compound is simply made by combining the calcined ferrite powder made, for example, by precipitation, with the catalytic component of the invention. In one embodiment, powders of Ni, Co, or Cu ferrite are added to the noble metal/ceria/alumina catalytic component and mixed to form a homogeneous composite. This mixing can be conveniently performed during the preparation of the slurry required to coat the final catalyst composite on a honeycomb ceramic or metal substrate.

It is also contemplated as within the scope of this invention that the introduction of the platinum group metals may be performed either before or after the ferrite additive has been mixed with the ceria/alumina catalytic components. In the embodiment given above the noble metals are added only to the ceria/alumina mixture and this calcined composite is then added to the ferrite powder and mixed to form a homogenous mixture. In a second example the ferrite additive can be first homogeneously mixed with the ceria/alumina components and the noble metals can then be added by a conventional impregnation procedure. After drying, calcining, and activating the resulting composite catalyst, the resulting mixture can be slurried in an aqueous solution and coated onto a ceramic or metal monolith according to practices well known in the art. In a third embodiment the ferrite additive can be homogeneously mixed with the ceria/alumina composite, slurried, and coated on the ceramic or metal substrate and then the desired noble metals can be impregnated directly onto the coated monolith using the previously mentioned aqueous or organic solutions well known in the art.

Thus, the finished catalysts of the present invention are used in the exhaust system of an automobile as catalytically coated rigid skeletal monoliths, or honeycomb elements where there are a multiplicity of longitudinal passageways or cells in each unit in order to provide a large nominal surface area. The rigid monolithic, honeycomb structures are typically made from cordierite, aluminosilicates, magnesium silicates, sillimanite, zircon, petalite, spodumene, mullite, aluminum titanates, zirconium titanates, or combinations thereof. The monoliths may also be made from a variety of metals (including alloys) known to the art that have sufficient oxidation resistance for the mobile source catalyst application. Such metals and alloys include, e.g., austenitic and ferritic stainless steel alloys. Such monoliths are well known in the art. They present relatively non-porous surfaces, and for use in our invention require coating with a washcoat comprising the effective catalytic components and ferrite additive. The washcoat may be applied to the monolithic substrate by any conventional means, e.g., by dipping the monolith into the washcoat slurry in the case of a formed body or by coating a continuous strip of metal foil. Thereafter, the washcoated monolith is drained, blown with air to remove excess slurry, and then calcined to drive off water. This leaves the catalyst as a dry, adherent coating on the monolith.

Our research results indicate that substantially any metal ferrite can be used as an $H_2S$ gettering agent with substantially any TWC catalyst that contains a platinum-group metal on (optionally) a rare earth oxide promoted support without prohibitive sacrifice of TWC characteristics. By rare earths we mean elements 57-71 inclusive.

The mechanism whereby a metal ferrite works as an $H_2S$ gettering agent is similar to other getter mechanisms such as those proposed for NiO. The following scheme, though not defining the ultimate chemistry, is consistent with our research results and with representation of $H_2S$ gettering mechanisms in general.

Gasoline fuel typically contains about 0.005 to about 0.7 weight percent sulfur, usually as organic sulfur compounds. During the combustion process these sulfur compounds are converted to gaseous sulfur compounds such as $SO_2$ and $SO_3$. In order to completely combust the gasoline fuel, at least a stoichiometric weight amount of air is required. For example if the gasoline is indolene, the stoichiometric weight ratio is 14.56:1 of air:fuel. Using this ratio, therefore, one obtains that the gaseous sulfur compound concentration in the exhaust gas may range from about 3 to about 480 ppm.

During the time that the exhaust gas is stoichiometric or net oxidizing, certain components of the catalyst are capable of reacting with the gaseous sulfur compounds in the exhaust gas ($SO_2$ and $SO_3$) and with $O_2$ in the exhaust gas to form stable sulfates. For example, alumina would be expected to form sulfates of aluminum such as $Al_2(SO_4)_3$ at temperatures below about 400° C. and at a gaseous sulfur oxides ($SO_x$) concentration of 20 ppm; cerium oxide will similarly form sulfates of cerium such as $Ce_2(SO_4)_3$ at the same gaseous $SO_x$ level at temperatures below about 500° C., while lanthanum oxide will form sulfates of lanthanum at the same $SO_x$ level but at temperatures below about 700° C.

The resultant sulfates formed on the catalytic composite at the conditions described above are unstable under fuel rich conditions. Therefore, when the air/fuel ratio becomes fuel rich, the solid sulfates will begin to decompose with the subsequent formation of hydrogen sulfide ($H_2S$), which will be emitted from the exhaust at concentrations that may be noxious. The reason that the concentrations of $H_2S$ may be excessively high is that large amounts of sulfates can be stored on the catalytic composite under periods of stoichiometric or fuel lean operations and then released during periods of fuel rich operation.

More specifically, under fuel rich conditions the following general equilibria occur.

$$MSO_4 + H_2 \rightleftharpoons H_2S + H_2O + M \tag{1}$$

$$M + H_2S \rightleftharpoons MS + H_2 \tag{2}$$

where M represents a metal, $MSO_4$ represents the metal sulfate, MS represents a metal sulfide and M represents a reduction product of the metal sulfide, i.e. either the reduced metal or a lower oxidation state metal sulfide. Examples of metals which form sulfates by the equilibrium of equation (1) include aluminum, cerium, lanthanum, etc. Examples of metals which form stable sulfides by the equilibrium of equation (2) include nickel, cobalt, zinc, lead, etc. In our case the ferrite additive also is able to form a stable surface sulfide.

The instantaneous concentration of gaseous sulfur compounds in the exhaust gas from the engine is typically low, such as about 20 ppm. If all of these gaseous sulfur compounds, i.e. $SO_2$ and $SO_3$ are converted to $H_2S$ during fuel rich operation then only 20 ppm of hydrogen sulfide would be present in the exhaust exiting the tail pipe. However, much larger amounts of $H_2S$ can be formed during fuel rich operation from the release of sulfur stored on the catalyst.

Because the getter forms a stable sulfide under fuel rich operation the $H_2S$ released due to stored sulfur is scavenged by the additive (in our case a ferrite), forming a stable sulfide. Return to oxygen rich operation causes the sulfide to release its sulfur as non-odorous $SO_2$ or $SO_3$, and the additive is regenerated and is capable of scavenging $H_2S$ once again.

Catalyst performance as well as the ability to scavenge $H_2S$ are essential requirements of these systems. Our invention meets these requirements by minimizing interactions between the catalyst and getter by having each function on physically separated particles in the catalyst coating. The ferrite additives are separate, discrete powders and are physically mixed with the catalytic function to form the finished coating. In this manner unwanted interactions that may result at high temperatures in the exhaust environment are minimized, and the catalytic activity and durability of the system remain at a high level.

Having described the basic aspects of our invention, the following examples are given to illustrate specific embodiments thereof.

EXAMPLE 1

Preparation of Ferrite Powders 18607 g cobalt nitrate and 51.657 g ferric nitrate were dissolved in 1 liter of water. 51.197 g tetramethyl ammonium hydroxide were dissolved in 2 liters of water. The nitrate solution was then added slowly to the stirred hydroxide solution. The resulting precipitate was filtered, dried at 120° C., crushed, and calcined in air at 1000° C. for 4 hours to provide $CoFe_2O_4$.

Preparations for $NiFe_2O_4$, $MnFe_2O_4$, $ZnFe_2O_4$, and $CuFe_2O_4$ were done in a similar fashion, with substitution of nickel, copper, zinc, or manganese nitrate for cobalt nitrate.

EXAMPLE 2

Conventional Washcoat Preparation

A conventional three-way washcoat was prepared by the following method. In a rotating beaker, 100 g of a co-precipitated $La_2O_3/Al_2O_3$ were mixed with 95 g of a solution of cerium nitrate. The $La_2O_3/Al_2O_3$ powder contained 4 wt. % $La_2O_3$ and had been calcined in air to 870° C. for 1 hour prior to addition of the nitrate solution in order to adjust the surface area of this powder to ca. 200 $m^2/g$. The cerium nitrate solution contained 9.5 wt. % Ce. After contacting the nitrate solution with the $La_2O_3/Al_2O_3$ powder, the resultant mixture was transferred to a shallow tray, dried for 16 hours at 120° C. and then calcined in air at 927° C. for 1 hour.

The resulting $CeO_2/La_2O_3/Al_2O_3$ powder described above was next impregnated with platinum and rhodium metals. In a rotating beaker, the $CeO_2/La_2O_3/Al_2O_3$ powder was contacted with 78 g of an aqueous solution containing 5.79 g of chloroplatinic acid (22 wt. % Pt) and 4.72 g of rhodium chloride (5.4 wt. % Rh). After contacting the noble metal solution with the alumina-based powder, the resultant mixture was transferred to a shallow tray, dried for 16 hours at 120° C. and then calcined in air at 538° C. for 1 hour.

The noble metal containing powder thus prepared was then added to 225 g of $H_2O$. This slurry was placed in a suitably sized ball mill jar and milled for 16 hours. The solids content of the milled slurry was then adjusted to 33 wt. % solids by the addition of water. Pieces of cordierite monolith, one inch diameter by one inch long, containing 400 square channels per square inch of facial area, were then dipped into the slurry described above. After dipping, the excess slurry was blown out with an air hose. The slurry coated monolith was dried for 3 hours at 120° C. The above described dipping, blow-out, and drying steps were repeated until the monolith samples contained 130 g of coating per liter of monolith volume. The coated monoliths were then calcined in air for 1 hour at 538° C. This catalytic composite was designated Catalyst A. The calculated composition of Pt, Rh, and Ce in Catalyst A in units of g/liter was: Pt=1.47; Rh=0.294; and Ce=10.6.

EXAMPLE 3

Washcoat Preparations with Ferrite Additives

A series of washcoats was prepared incorporating ferrite additives according to the following procedure. A noble metal-containing-$CeO_2/La_2O_3/Al_2O_3$ powder was prepared as in Example 2. The Pt and Rh concentration of this powder was formulated to be exactly the same as detailed in Example 2. 90 g of this Pt/Rh-containing powder and 10 g of $CoFe_2O_4$ powder prepared as described in Example 1 were added to 203 g of water. The resulting slurry was ball milled for 16 hours. This slurry was then used to coat similarly sized cordierite monoliths as used in Example 2. The coating, blow-out, and drying steps were repeated until the monolith samples contained 144 g of coating per liter of monolith volume. The coated monoliths were then calcined in air for 1 hour at 538° C. This catalytic composite was designated Catalyst B. The calculated composition (Pt, Rh, Ce, and $CoFe_2O_4$) of Catalyst B in units of g/liter was: Pt=1.47; Rh=0.294; Ce=10.6; and $CoFe_2O_4$=14.4.

Catalysts C, D, E, and F were then prepared in a similar fashion by substituting an appropriate ferrite powder for the $CoFe_2O_4$ powder described above. Table 1 identifies the catalysts with respect to ferrite. For all these catalysts, A–F, loadings (g/liter) were: Pt=1.47; Rh=0.294; Ce=10.6; and ferrite=14.4.

TABLE 1

| Catalyst | Ferrite |
|---|---|
| A | None |
| B | $CoFe_2O_4$ |
| C | $NiFe_2O_4$ |
| D | $CuFe_2O_4$ |
| E | $MnFe_2O_4$ |
| F | $ZnFe_2O_4$ |

EXAMPLE 4

Washcoat Preparations with Binary Oxide Additives

For the purpose of comparison several catalysts were prepared incorporating binary oxides of Ni (NiO), Cu (CuO), and Co ($Co_3O_4$). These binary oxide powders were prepared by precipitating the oxides from the appropriate nitrate solution using tetramethyl ammonium hydroxide in a manner similar to that described in Example 1 for the ferrite powders. The resulting precipitate was filtered, dried at 120° C., crushed, and calcined in air at 1000° C. for 4 hours.

Catalysts were prepared with each of these binary oxide powders in a manner similar to that used for the ferrite additives (described in Example 3). That is, 10 g of the binary oxide powder and 90 g of the noble metal containing powder described in Example 2 were added to 203 g of water. The slurry was ball milled for 16 hours and then coated onto cordierite monoliths of the same size used in Catalysts A–F. The coating procedure followed was as described in Example 3, with the final coating weight being 144 g of coating per liter of monolith volume. The catalysts made with these binary oxides were designated Catalysts G, H, and I. Table 2 identifies the catalysts with respect to the oxide additive used herein. In all three catalysts, G–I, loadings (g/liter) were Pt=1.47; Ph=0.294; Ce=10.6; and oxide additive=14.4.

TABLE 2

| Catalyst | Oxide Additive |
|---|---|
| G | NiO |
| H | CuO |
| I | $Co_3O_4$ |

Catalyst G incorporates a NiO getter according to the art described in EP 244,127. This technology is used commercially in automotive applications and will serve as a standard by which to judge the performance of the ferrite additives disclosed here.

EXAMPLE 5

Testing Procedure

A fresh sample of each of the Catalysts A–I was evaluated for $H_2S$ emissions using a laboratory reactor system operated according to the following protocol: An 8.5 cc catalyst sample in a tubular Vycor glass reactor with 2.6 cm I.D. was heated to 550° C. in a preheated $N_2$ stream containing approximately 13% water vapor in a Vycor glass preheater being maintained at 650° C. wall—flowing at a rate of approximately 2.2 liters total/min. Once 550° C. is reached, all component gases in Table 3 but CO, $H_2$, $O_2$, and $SO_2$ are introduced into the feed gas. Then $SO_2$ along with CO, $H_2$, and $O_2$ gases are admitted at controlled rates to establish a steady lean condition represented in Table 3 by coupling a pair of solenoid valves with two pairs of timers while maintaining a total gaseous flow rate of 2.83 liters per minute at room temperature and 1 atm. pressure. After exposing the catalyst sample to this lean condition for 15 minutes, the condition is changed to a rich condition shown in Table 3 simply be resetting the two pairs of timers. As soon as the operating condition is switched to the rich condition from the lean condition, 200-fold diluted sample of the outlet gas is sampled continuously and analyzed for $H_2S$ using the specified analyzer. The digital readout in ppb of $H_2S$ is converted to ppm $H_2S$ taking the dilution factor into account. To assess the stability of catalyst performance in $H_2S$ emission, such tests are repeated on one sample up to 4 times by repeating the lean (15 min.)-rich (10 min.) cycles.

TABLE 3

| Laboratory Test Conditions for $H_2S$ | |
|---|---|
| Catalyst Charge, $cm^3$ | 8.5 |
| Total Gas Flow Rate, Liter (NTP)/min | 2.83 |
| GHSV | 20,000 |

| Feed Composition (vol %) | | |
|---|---|---|
| Component | Lean Condition | Rich Condition |
| CO | 0.45 | 5.00 |
| $H_2$ | 0.15 | 1.67 |
| HC($C_3H_6/C_3H_8$ = 3) | 0.0400 | 0.0400 |
| $O_2$ | 0.35 | 0.00 |
| $CO_2$ | 14.5 | 14.5 |
| $H_2O$ | 13 | 13 |
| $SO_2$ | 0.0035 | 0.0035 |
| NO | 0.185 | 0.185 |
| $N_2$ | Balance | Balance |
| Bed Temperature, °C. | 550 | 550 |
| P, inches of water | 15 | 15 |
| Exposure Time, minutes | 15 | 10 |
| $H_2S$ Analyzer | Tracor Atlas Model 825RD with 200x dilution system | |

The FIGURE shows $H_2S$ emissions measured during the rich portion of the test for the conventional catalyst (Catalyst A) and Catalysts B, C, D, and G. Catalyst A containing no $H_2S$-getter ingredient (control) exhibits the highest $H_2S$ emission in the vicinity of 30 seconds, i.e., at the time of the third sampling. This time for the peak level of $H_2S$ emission is related, in part, to the way the bench test unit is set up, e.g., the volume of preheater, total flow rate of feed gas, and the volume of sampling system, etc. Because the $H_2S$ odor must be more closely related to the level of peak $H_2S$ emission, the peak $H_2S$ levels found in the bench tests are tabulated in Table 4 as an indication of the catalyst performance in limiting $H_2S$ emissions.

TABLE 4

$H_2S$ Emissions from Specified Catalytic Washcoats $H_2S$ Peak Emissions (ppm)

| Catalyst | Fresh Sample | Samples aged at 980° C. for 4 hours in air | Samples aged in the presence of exhaust poisons for 4 hours |
|---|---|---|---|
| A | 106 | 25 | 46 |
| B | 30 | 18 | 18 |
| C | 44 | N/A | 20 |
| D | 29 | 17 | N/A |
| E | 60 | N/A | N/A |
| F | 70 | N/A | N/A |
| G | 26 | 17 | N/A |
| H | 19 | N/A | N/A |
| I | 19 | N/A | N/A |

"N/A" = not available.

As the data of Table 4 indicate, all of the fresh catalysts incorporating ferrite additives are successful, in varying degrees, in limiting peak $H_2S$ emissions below that of the fresh catalyst with no ferrite or oxide additives (Catalyst A). Several of the fresh ferrite-containing catalysts, notably Catalysts B, C, and D substantially reduce peak $H_2S$ emissions below that of Catalyst A and are as effective in reducing peak $H_2S$ emissions as Catalyst G—the fresh catalyst incorporating the commercially used additive, NiO.

EXAMPLE 6

Aging Variations

As a further measure of limiting $H_2S$ emissions several of the catalysts described above were subjected to two different aging protocols and then retested for $H_2S$ emissions as described in Example 5. In the first aging protocol, catalyst samples were calcined in air for 4 hours at 980° C. to simulate high temperature exposure in an oxygen-rich exhaust stream. Table 4 summarizes peak $H_2S$ emissions measured using the protocols described in Example 5 for the conventional Catalyst A, ferrite-containing Catalysts B and D, and NiO-containing Catalyst G. Again, the ferrite-containing catalysts continued to show low H₂S emission levels after this high temperature exposure to oxygen.

In a second aging procedure, catalyst samples were exposed to a combustion stream containing high levels of potential poisons present in an automotive exhaust, including S, Pb, P, and Zn. The combustion stream was formed by combusting n-hexane containing 800 ppm S, 70 ppm Pb, 112 ppm P, and 70 ppm Zn. This so-called "pulsator aging" is known to the art and described in detail by M. V. Ernest and G. Kim in SAE Paper No. 800083.

Samples of Catalysts A, B, and C were exposed to this combustion mixture for 4 hours. Gas flow over the catalyst was 2.7 liters/min at STP, and the catalyst temperature was varied between 640° C. for 90 minutes and 855° C. for 15 minutes during the 4 hour aging time. In the 4 hours of pulsator-aging described here, catalyst samples are expected to have poison levels equivalent to 2,000–3,000 miles of vehicle service. At the conclusion of the 4 hour exposure, samples were evaluated for H₂S emissions using the protocols described in Example 5. Table 4 summarizes peak H₂S emissions measured for Catalysts A, B, and C after exposure to these typical poisons. As can be seen from the data of Table 4, this poison exposure does not adversely affect the ability of the ferrite additives to maintain low peak H₂S emissions relative to the conventional Catalyst A.

EXAMPLE 7

Catalyst Performance After Aging

As discussed previously, low H₂S emissions are only one important measure of performance with these catalysts. It is also important that these catalysts maintain high levels of activity for hydrocarbon and carbon monoxide oxidation, and the reduction of nitrogen oxides. In order to evaluate catalytic performance, catalyst samples were subjected to the aging protocols described in Example 6 and then evaluated for three-way catalyst performance using a laboratory cycling reactor described by M. V. Ernest and G. Kim in SAE Paper No. 800083. In this performance evaluation, catalyst samples are exposed to a simulated exhaust stream that is oscillated about a set point in inlet gas composition in order to simulate the cyclic behavior of real exhaust streams in motor vehicles. A 12.9 cc catalyst sample is used in these evaluations. Total gas flow through the reactor is 8.5 liters/min at STP, and an inlet gas temperature of 482° C. and an inlet gas pressure of 13 inches H₂O are maintained by suitable control devices. Catalyst efficiencies were measured for hydrocarbon (HC), CO, and NO activity at several inlet gas composition set points that vary between a net oxidizing feed to a net reducing feed.

Table 5 summarizes catalyst performance for several catalysts described in Examples 1–4 after high temperature calcination (4 hours in air at 980° C.) and after 90 hours of pulsator aging as described in Example 6. These two tests provide information on catalyst performance after high temperature exposure in the presence of an oxidizing atmosphere in the case of the calcination treatment, and after accelerated exposure to a combustion stream containing poisons typically found in exhaust environments. The later pulsator conditions simulated 50,000 miles of vehicle service.

TABLE 5

| Sample | Three-way Catalyst Activities (% conversions) | | | | | | | | |
|---|---|---|---|---|---|---|---|---|---|
| | R* = 1.32 (lean) | | | R* = 1.00 (stoich) | | | R* = 0.76 (rich) | | |
| | HC | CO | NO | HC | CO | NO | HC | CO | NO |
| Fresh | | | | | | | | | |
| Catalyst A | 95 | 93 | 81 | 93 | 89 | 94 | 93 | 82 | 85 |
| Catalyst H | 57 | 86 | 5 | 54 | 85 | 74 | 34 | 69 | 88 |
| Catalyst D | 91 | 90 | 77 | 92 | 87 | 93 | 90 | 79 | 94 |
| 980° C., 4 h in air aged | | | | | | | | | |
| Catalyst A | 82 | 72 | 67 | 79 | 63 | 72 | 75 | 54 | 74 |
| Catalyst H | 61 | 79 | 33 | 52 | 70 | 47 | 38 | 51 | 41 |
| Catalyst D | 72 | 74 | 53 | 64 | 64 | 54 | 52 | 51 | 52 |
| Catalyst I | 77 | 62 | 59 | 73 | 54 | 61 | 66 | 43 | 62 |
| Catalyst B | 86 | 71 | 67 | 82 | 62 | 71 | 76 | 52 | 74 |
| Catalyst G | 75 | 71 | 67 | 70 | 66 | 71 | 62 | 56 | 76 |
| Catalyst C | 81 | 71 | 63 | 77 | 65 | 68 | 72 | 58 | 71 |
| 90 h pulsator aged | | | | | | | | | |
| Catalyst A | 80 | 68 | 63 | 77 | 61 | 65 | 71 | 51 | 66 |
| Catalyst B | 80 | 67 | 62 | 76 | 63 | 67 | 71 | 58 | 71 |

*R value, a measure of air/fuel ratio is defined as follows:

$$R = \frac{[O_2] + 0.5[NO]}{0.5[CO] + 0.5[H_2] + 4.5[C_3H_6] + 5.0[C_3H_8]}$$

where the concentration of each gaseous component is in vol. % or mole %. R < 1, R = 1, and R > 1 thus represent net reducing, stoichiometric, and net oxidizing conditions, respectively.

As can be seen in Table 5 each of the ferrite containing catalysts (Catalysts B, C, and D) show three-way performance very similar to that of the conventional Catalyst A that contains no low-H₂S emission additives. Performance of these aged ferrite-containing catalysts is also similar to that displayed by the commercially used NiO-containing Catalyst G. Of particular interest is the three-way activity of Catalysts H and I. These catalysts incorporate non-Ni additives such as Cu and Co in the conventional Catalyst A in the form of binary oxides. In each case the fresh and aged activity of these catalysts is below that exhibited by the corresponding ferrite-containing catalyst. That is to say, CoFe₂O₄ and CuFe₂O₄ not only provide reduced H₂S emission when incorporated into three-way catalyst formulations, but these additives result in superior catalyst performance over binary oxide additives such as Co₃O₄ or CuO.

EXAMPLE 8

Ferrite-containing Catalyst on Metal Substrate

In order to show the applicability of this invention to metal monolith substrates and to catalysts which incorporate bulk cerium oxide as a promoter, the following catalysts were made and tested for H₂S emissions.

The same $La_2O_3/Al_2O_3$ powder described in Example 2 was used as the inorganic oxide support. In this preparation 15 g of $La_2O_3/Al_2O_3$ powder was added to 45 g of water. The slurry was stirred while 1.61 g of platinum (II) chloride solution (7 wt. % Pt) and 0.45 g of rhodium chloride solution (5% Rh) were added. The noble metals Pt and Rh were then reduced to metals in the above slurry by adding 0.19 g of hydrazine hydrochloride and heating the slurry to 80° C. for 10 minutes. The pH of the slurry was adjusted to 9 with NaOH, filtered, and subsequently washed with 750 g of deionized water. The resulting filter cake was then added to 50.60 g water and ball milled together with 5.95 g cerium oxide powder, 1.19 g nitric acid, 1.67 g of alumina, and 1.19 g of $CoFe_2O_4$ powder prepared by the procedure given in Example 1. The resulting slurry was then coated on a one inch wide strip made from a ferritic stainless steel alloy containing 20 wt. % Cr, 5.2 wt. % Al, and 0.02 wt. % Ce. This foil is described in detail in U.S. Pat. Nos. 4,414,023 and 4,661,169. Prior to coating, this foil strip had been corrugated with a herring-bone pattern and heat treated according to the teachings of U.S. Pat. No. 4,711,009. The coating was done by brush, followed by air calcination at 500° C. for 10 minutes. The coating and calcination procedure was repeated until a final coating weight of 30 mg of coating per square inch of foil area had been achieved. A 21 inch length of the coated one inch strip from above was then rolled to form a one inch diameter by one inch long catalyst sample. This catalyst was designated as Catalyst J.

A procedure similar to that described above was used to prepare Catalysts K and L, containing $NiFe_2O_4$ and NiO oxide powders, respectively, by substituting these powders for $CoFe_2O_4$ above and using the same metal foil substrate. Table 6 below summarizes calculated loadings for Pt, Rh, Ce, and the appropriate additive for Catalysts J–L.

As a control, one additional catalyst was prepared as described above except no additive was included. That is the Pt and Rh containing $La_2O_3/Al_2O_3$ powder was combined with only bulk cerium oxide, nitric acid, and alumina in the same proportions described above. The resulting aqueous slurry was milled and coated on the same metal foil used above and formed into a one inch diameter by one inch long sample designated as Catalyst M. Calculated loadings of Pt, Rh, and Ce for Catalyst M are also included in Table 6, below.

TABLE 6

| Sample | Pt loading g/liter | Rh loading g/liter | Ce loading g/liter | Additive with loading g/liter |
|---|---|---|---|---|
| Catalyst J | 0.587 | 0.118 | 25.3 | $CoFe_2O_4$, 6.2 |
| Catalyst K | 0.587 | 0.118 | 25.3 | $NiFe_2O_4$, 6.2 |
| Catalyst L | 0.587 | 0.118 | 25.3 | NiO, 6.2 |
| Catalyst M | 0.587 | 0.118 | 25.3 | No Additive |

Catalysts J–M were each then tested for $H_2S$ emissions according to the protocols of Example 3. Table 7 below summarizes peak $H_2S$ emissions measured for these fresh catalysts.

TABLE 7

| Sample | Additive | Peak $H_2S$ conc. after rich exhaust exposure, ppm |
|---|---|---|
| Catalyst J | $CoFe_2O_4$ | 20 |
| Catalyst K | $NiFe_2O_4$ | 49 |

TABLE 7-continued

| Sample | Additive | Peak $H_2S$ conc. after rich exhaust exposure, ppm |
|---|---|---|
| Catalyst L | NiO | 20 |
| Catalyst M | None | 92 |

As can be seen from the data of Table 7 for these catalysts supported on metal foils the ferrite additives $CoFe_2O_4$ and $NiFe_2O_4$ are as effective in reducing $H_2S$ emissions as the NiO additive used in commercial practice.

It is understood that the foregoing detailed description is given merely by way of illustration and that many variations may be made therein without departing from the spirit of this invention.

What is claimed is:

1. Automotive exhaust catalyst comprising a support carrying a catalytically effective amount of at least one platinum group metal and an $H_2S$ gettering amount of a metal ferrite having the formula $MFe_2O_4$, where M is Co, Ni, Cu, Zn, Mn, or Fe.

2. Catalyst of claim 1, wherein the ferrite is about 1–20 weight % of the catalyst.

3. Catalyst of claim 1, wherein the ferrite is about 3–15 weight % of the catalyst, the catalyst carrying support is 85–97 weight % of the catalyst and the catalyst carrying support is catalyzed alumina comprising about 1.5 weight % Pt, about 0.5 weight % Pd, about 0.3 weight % Rh, about 4 weight % lanthana, about 25 weight % ceria, and balance alumina.

4. Catalyst of claim 1, wherein the weight ratio of metal ferrite:platinum group metal(s) is about 1–100:1.

5. Catalyst according to claim 4, wherein the ratio is about 10:1.

6. Catalyst of claim 1, being an adherent coating on a substrate.

7. Catalyst according to claim 6, wherein the substrate is a ceramic monolith.

8. Catalyst according to claim 6, wherein the substrate is a metal foil or plate.

9. Catalyst according to claim 1, wherein M is Co.

10. Catalyst according to claim 1, wherein M is Ni.

11. Catalyst according to claim 1, wherein M is Cu.

12. Catalyst according to claim 1, wherein M is Zn.

13. Catalyst according to claim 1, wherein the platinum group metals comprise at least platinum and rhodium.

14. Catalyst according to claim 1, wherein the support is an alumina washcoat powder.

15. Catalyst according to claim 1, wherein lanthana is initially deposited on the support; then ceria; then one or more platinum group metals, then metal ferrite.

16. Washcoat slurry comprising in weight %, intimate admixture of:
about 0.2–7 weight % metal ferrite having the formula $MFe_2O_4$, where M is Co, Ni, Cu, Zn, Mn, or Fe;
about 20–50 weight % catalyzed alumina;
and water, to made 100 weight %; provided that the ferrite is about 1–20 weight % of the total of ferrite plus catalyzed alumina and that the catalyzed alumina is 80–99 weight % of the total of ferrite plus catalyzed alumina;
said catalyzed alumina comprising in weight %:
about 0.1–7.5 % Pt, Pd, and/or Rh, but not exceeding 2.5% of any of Pt, Pd, or Rh individually;

about 0-50% rare earth oxides; and alumina to make 100%.

17. Slurry according to claim 16, comprising about 4 weight % of metal ferrite; about 40 weight % catalyzed alumina; and about 56 weight % water; said catalyzed alumina comprising about 1.5 weight % Pt, about 0.5 weight % Pd, about 0.3 weight % Rh, about 4 weight % lanthana, about 25 weight % ceria, and balance alumina.

18. Method of preparing the washcoat slurry of claim 16 comprising intimately mixing a metal ferrite with catalyzed alumina in an aqueous slurry.

19. Method of making a catalyst-coated substrate which is suitable for use for auto emission comprising coating a substrate with the washcoat slurry of claim 16 followed by drying and calcining the coated substrate thereby to provide an adherent catalyst coating thereon.

20. Catalyst-coated substrate made by the method of claim 19.

21. Catalyst-coated substrate according to claim 20, where the substrate is ceramic or metal.

* * * * *